Nov. 4, 1952      R. C. HEIDEMAN      2,616,718
FOLDABLE BABY STROLLER
Filed Dec. 30, 1949      3 Sheets-Sheet 1
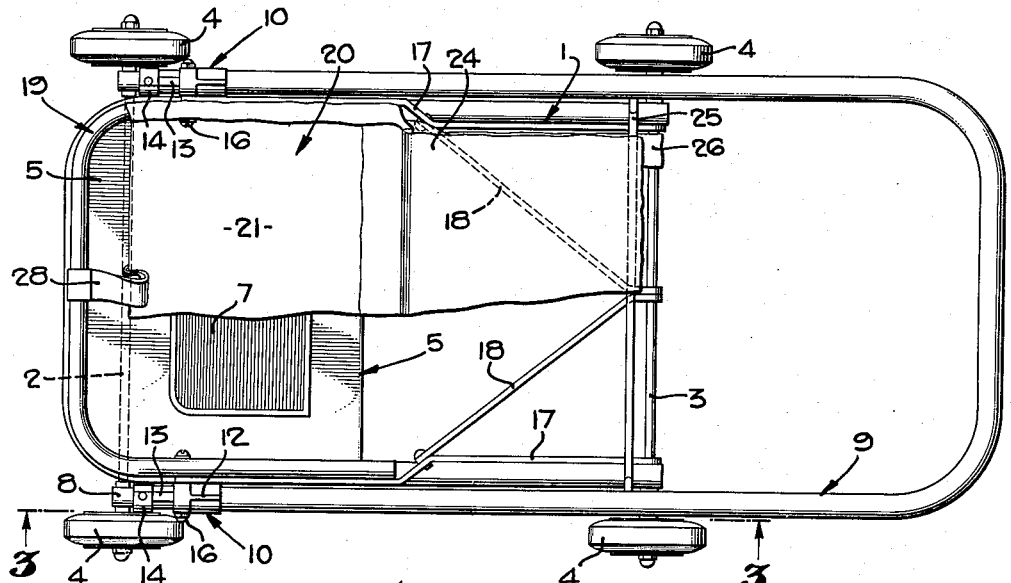
FIG. 1.
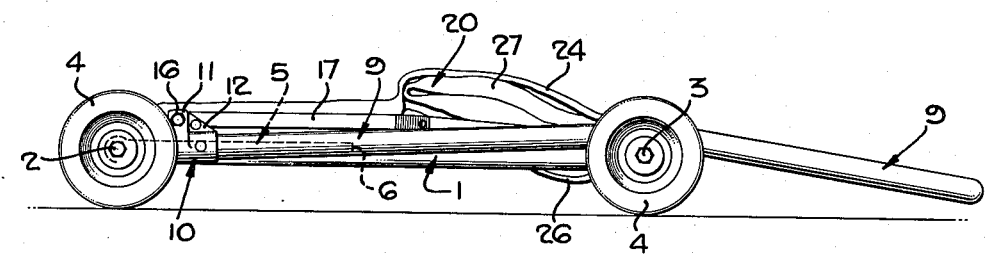
FIG. 2.
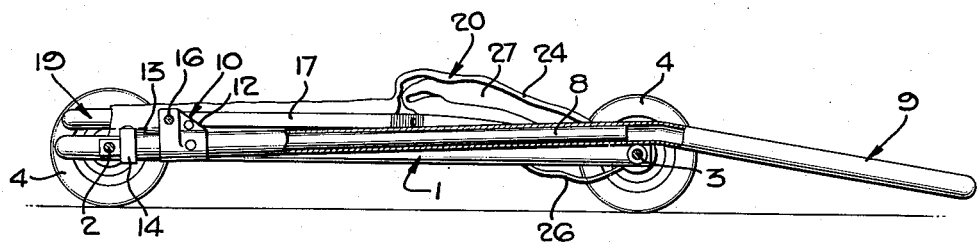
FIG. 3.
INVENTOR.
ROBERT C. HEIDEMAN,
BY
ATTORNEYS.

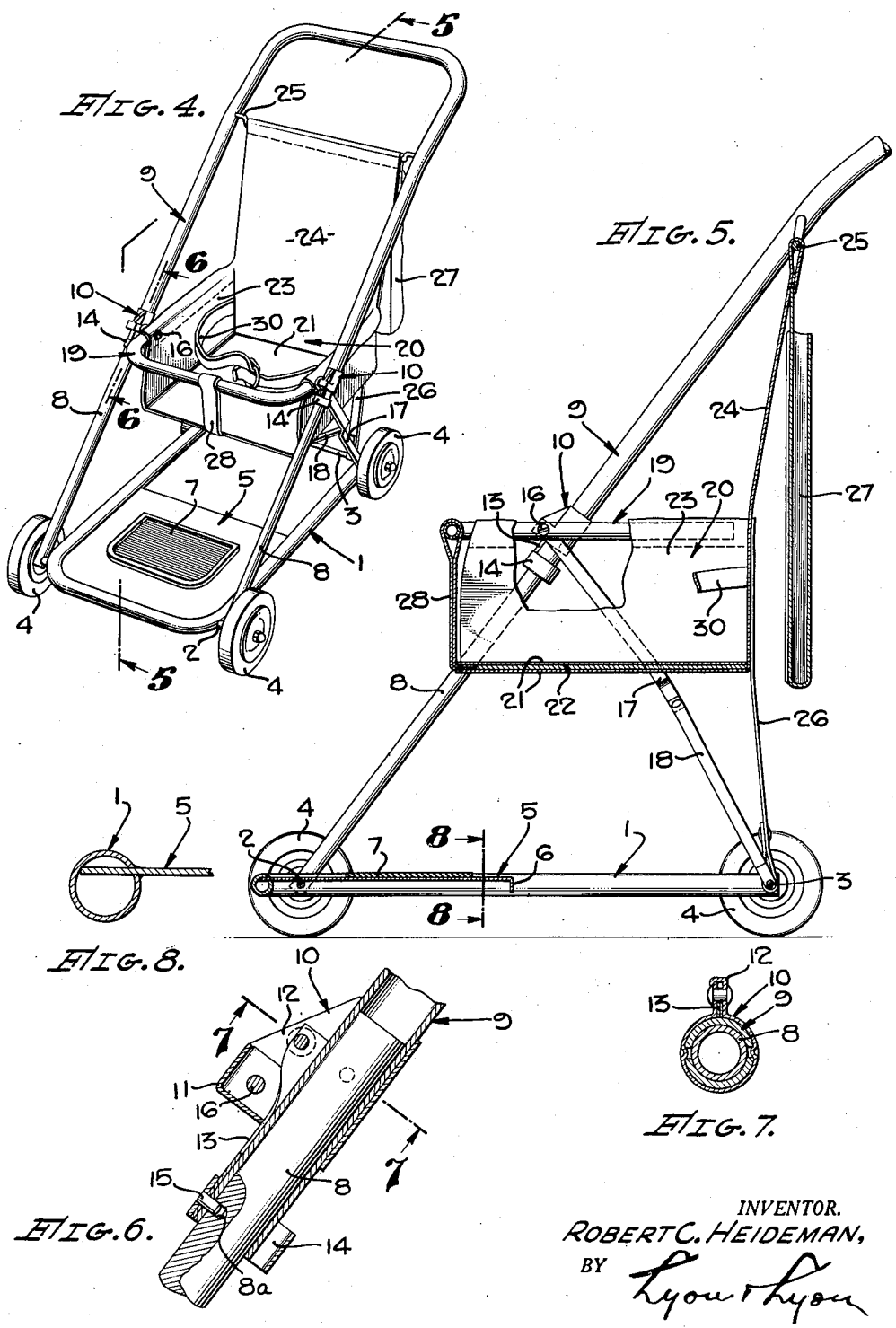

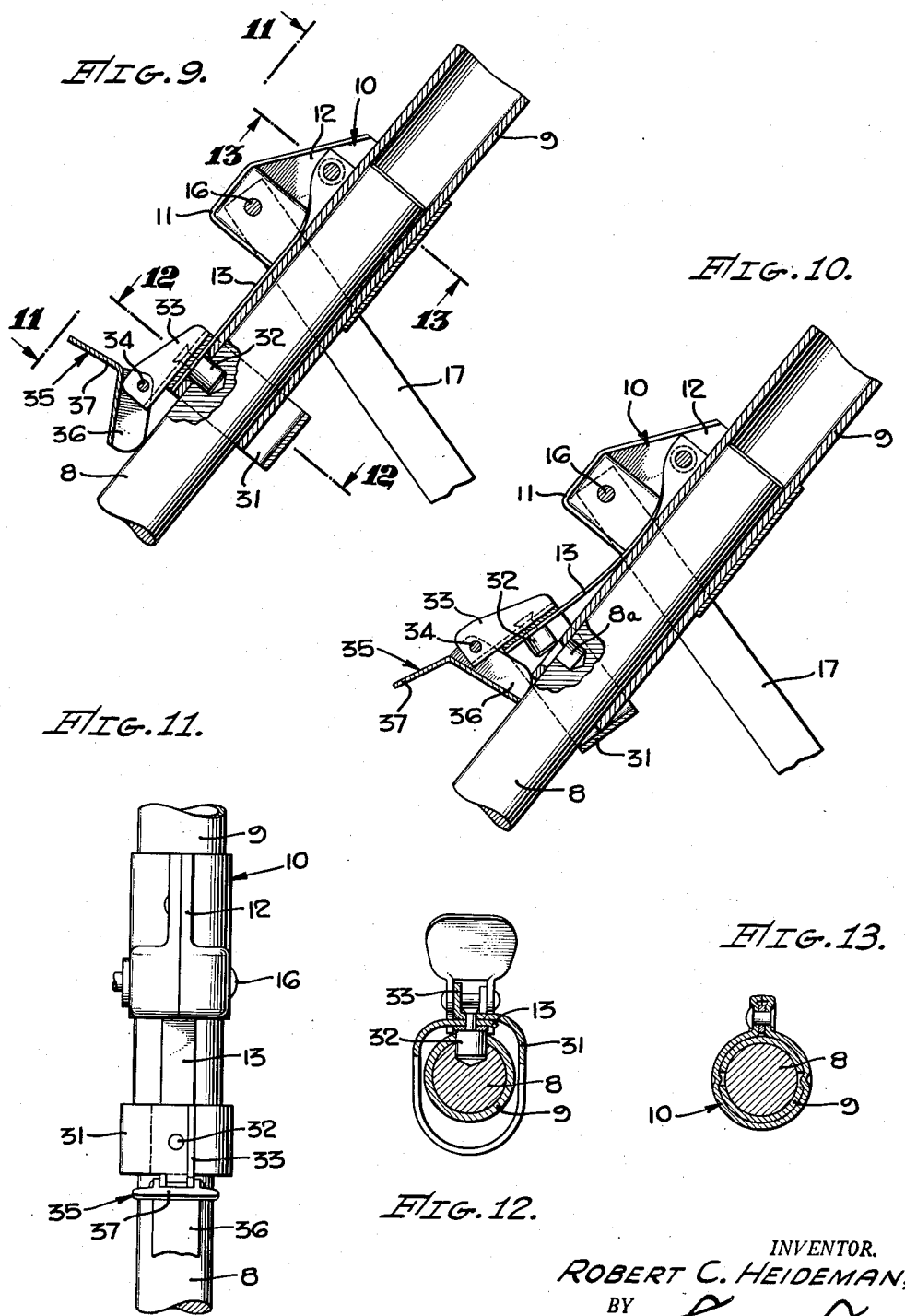

Patented Nov. 4, 1952

2,616,718

UNITED STATES PATENT OFFICE 2,616,718

FOLDABLE BABY STROLLER

Robert C. Heideman, Los Angeles, Calif., assignor to American Carry-Products Company, Inc., North Hollywood, Calif., a corporation of California Application December 30, 1949, Serial No. 136,004

8 Claims. (Cl. 280—36)

My invention relates to baby strollers and constitutes a continuation-in-part of my copending application Serial No. 89,446, filed April 25, 1949, now abandoned. Included in the objects of my invention are:

First, to provide a baby stroller which may be folded for storage or opened for use by simple manipulations capable of being performed when one is encumbered by a small child.

Second, to provide a baby stroller which is particularly lightweight and which folds flatwise and on being folded is reduced in length to form a particularly compact flat unit easily stored in a small space or carried in crowded places such as buses, street cars, or other public vehicles.

Third, to provide a baby stroller which on folding maintains the front wheels in operative position so that the stroller may be wheeled instead of being carried.

Fourth, to provide a baby stroller which incorporates a novelly arranged framework structure and means for pivotally suspending a seat therein to facilitate folding, the seat being retained in a horizontal position when the device is opened for use, by means of readily foldable tension members.

With the above and other objects in view as may appear hereinafter, reference is made to the accompanying drawings, in which:

Fig. 1 is a top or plan view of my baby stroller as it appears when folded, the portion of the folded seat structure being broken away to illustrate the framework.

Fig. 2 is a side view of the baby stroller in its folded position.

Fig. 3 is a sectional view thereof through 3—3 of Fig. 1.

Fig. 4 is a perspective view of the baby stroller in its open position.

Fig. 5 is a sectional view thereof, in its open position, the section being taken in the plan 5—5 of Fig. 4.

Fig. 6 is an enlarged detailed sectional view taken substantially in the plan 6—6 of Fig. 4.

Fig. 7 is a transverse sectional view through 7—7 of Fig. 6.

Fig. 8 is a transverse sectional view through 8—8 of Fig. 5.

Fig. 9 is a fragmentary section view similar to Fig. 6 showing a modified form of latch means, the latch means being in secured position.

Fig. 10 is a similar sectional view, but showing the latch means in its disengaging position.

Fig. 11 is a front view of the latch means taken along the plan 11—11 of Fig. 9.

Fig. 12 is a transverse sectional view thereof taken through 12—12 of Fig. 9.

Fig. 13 is another sectional view taken through 13—13 of Fig. 9.

My baby stroller includes a base frame 1 formed of tubular material and bent into U-form. The legs of the base frame carry a front axle 2 located adjacent the cross portion of the frame and a rear axle 3 located near the extremities of the frame. The axles are provided with wheels 4.

The forward portion of the base frame supports a platform 5. The platform may be supported by its margins in a slit or series of slits cut into the confronting sides of the frame. The rear edge of the platform 5 is provided with a reinforcing flange 6. A tread or pad 7 is cemented to the top of the platform.

Pivotally carried by the front axle 2 outwardly of the base frame 1 is a pair of struts 8 in the form of solid rods. The struts 8 telescope into the ends of a U-shaped handle frame 9. At the telescoping extremities of the handle frame 9 there are provided fittings 10. Each fitting is formed from sheet metal and rolled to form a tube or collar encompassing the handle frame, the extremities of the fitting being formed into confronting boss portions 11 reinforced by ribs 12. A leaf spring 13, is secured between the rib portions and protrudes from the fitting, the protruding portion being disposed flatwise relative to the strut 8. The extremity of the leaf spring is provided with a loop member 14 which surrounds the strut 8. An internal pin 15 is provided at the side of the loop joined to the leaf spring, which pin is adapted to enter a socket 8a in the strut to latch the strut in its extended position relative to the handle frame.

The boss portions 11 receive journal pins 16 to which are pivotally connected struts 17 which extend rearwardly and are pivotally carried by the rear axle 3, the struts 17 joining the axle immediately within the extremities of the base frame. Brace members 18 extend from the rear axle 3 to the mid-portions of the brace frame. The struts 17 may be bent slightly at their mid-portions so as to facilitate folding the baby stroller.

The journal pins 16 also support a seat frame 19. The seat frame is a U-shaped tubular structure with the cross portion directed forwardly. The seat frame supports a seat structure 20 which includes a bottom 21 formed of two plies of cloth between which is inserted a reinforcing plate 22. The side members 23, also of cloth, are provided with hems at their upper extremities into which are inserted the arms of the seat frame 19. The journal pins 16 extend through the material of the side members so that the seat structure is held in place.

The seat structure also includes a back member 24 of fabric, the upper end of which is provided with a hem to receive a cross bar 25, the extremities of which are secured in the sides of the handle frame 9. Attached to the back member 24 are depending anchor straps 26 which are looped around the rear axle 3.

If desired, a bag 27 may be suspended from the cross bar 25 behind the back member 24.

A retainer strap 28 extends from the central portion of the forward edge of the seat bottom 21 and is looped around the cross portion of the seat frame 19.

When it is desired to fold the baby stroller from its operating position shown in Figs. 4 and 5 to its position shown in Figs. 1, 2 and 3, the loops 14 are pressed upwardly and forwardly to release the pins 15. The struts 8 readily telescope into the handle frame 9, causing the rear struts 17 to pivot forwardly and downwardly so that the frame structure is not only folded flatwise but is shortened to a compact unit. The seat structure being formed of cloth, readily collapses and overlies the platform 5. The handle frame projects a short distance beyond the rear wheels and is preferably bent slightly in the region opposite the wheels, so that the cross portion of the handle is disposed in alignment with the center of gravity of the folded device; thus on carrying the device by the handle the baby stroller tends to hang vertically. It will be noted that the extremities of the base frame and seat frame are within the boundaries of the forward wheels so that the device may be wheeled after it has been collapsed.

A belt and buckle means 30 may be secured to the back member 24 within the side members 23.

Reference is now directed to Figures 9 to 13, which disclose a modified form of fitting and latch means between the struts 8, handle frame 9 and struts 17. In the previously described structure, two hands are sometimes required in order to lift simultaneously the loop members 14. In the modified structure this operation may be carried out with one hand by a person encumbered with a baby. In the modified arrangement a loop member 31 is substituted for the loop member 14 at the extremity of the spring 13. The loop member includes overlapping extremities which are secured by the reduced riveted end of a pin 32 which replaces the pin 15 and is adapted to enter the socket 8a provided in the strut 8.

One extremity of the loop member 31 secured by the pin 32 extends forwardly or downwardly in the direction of the strut 8, and its side margins are folded upwardly or outwardly to form a bracket 33 of channel-shaped cross-section. The bracket 33 receives a journal pin 34, on which is mounted a thumb lever 35. The thumb lever includes a channel-shaped cam arm 36, which bears against the strut 8, and a thumb plate 37 which extends outwardly.

The thumb lever 35 is so arranged that it may be pivoted from the position shown in Fig. 9 to the position shown in Fig. 10 and cause its cam arm 36 to engage the strut 8 and withdraw the pin 32 from the socket 8a. In so doing, the cam arm 36 urges the strut 8 into the tube 9, so that the pin 32 is displaced from the socket 8a. Thus, in order to fold the baby stroller, the thumb levers are engaged in sequence, and then the handle frame 9 is pushed downwardly on the struts 8 to collapse the structure. When unfolding the structure, the handle frame rides upwardly with respect to the struts 8 and such movement automatically returns the thumb levers 35 to their original position shown in Fig. 9.

Having fully described my invention, it is to be understood that I do not wish to be limited to the details herein set forth, but my invention is of the full scope of the appended claims.

I claim:

1. A baby stroller, involving: a base frame, a longitudinally collapsible handle frame pivotally connected to the forward end of said base frame; struts pivotally connected between the rear end of said base frame and to the mid-portion of said handle frame, said frames and struts movable between a collapsed position of substantial parallelism and an extended angular position; a seat unit including a rigid seat frame and a collapsible seat member pivotally supported by said handle frame adjacent its connections with said struts; and said seat unit including a collapsible back member and retainer straps extending between the remote extremity of said handle member and said base frame in the region of the connections between said base frame and struts.

2. A baby stroller, involving: a frame structure including a base frame, forward and rearward struts pivotally connected thereto, a handle frame telescopically connected with said forward struts, and fittings pivotally connecting said rear struts and handle frame at its telescoping extremities whereby said frame structure may be folded with said frames and struts in substantial parallelism and extended with said struts and base frame defining a triangle and said handle frame projecting upwardly in the plane of said forward struts; and a seat structure including a seat frame pivotally carried by said fittings, a seat member suspended from said seat frame, a back member connected with said handle frame, and retainer means connected with said base frame, said seat structure foldable flatwise with said frame structure.

3. A baby stroller, involving: a frame structure including a base frame, forward and rearward struts pivotally connected thereto, to form triangular truss units, a pivotal and slidable connecting means joining said struts and including latch means to restrain said truss units against collapse; a handle means extending from said frame structure; a seat structure pivotally suspended between said connecting means; retainer means incorporating said seat structure and extending between said handle means and base frame; and said frame and seat structures movable by collapse and expansion of said truss units between a nested position and an extended position, in which latter position said retainer means restrains said seat structure against pivotal movement.

4. A baby stroller, involving: a frame structure including a base frame, forward and rearward struts pivotally connected thereto, a handle frame telescopically connected with said forward struts, and fittings pivotally connecting said rear struts and handle frame at its telescoping extremities whereby said frame structure may be folded with said frames and struts in substantial parallelism and extended with said struts and base frame defining a triangle and said handle frame projecting upwardly in the plane of said forward struts; a seat structure pivotally suspended between said fittings; and foldable retainer means extending between said handle frame and incorporating said seat structure and said base frame, said retainer means being placed under tension when said frame structure is extended to restrain said seat structure in a horizontal position.

5. A baby stroller, involving: a base frame; a handle structure including a U-shaped handle and telescoping struts, said struts being pivotally connected to said base frame; fittings for latching said handle in an extended position on said struts; braces pivotally connected to the strut-receiving extremities of said handle and to said base frame, said struts, braces, handle and base frame adapted on release of said latch means to fold flatwise into substantial parallelism; and a seat structure including a seat frame pivotally carried by said fittings, a seat member suspended from said seat frame, a back member connected with said handle frame, and retainer means connected with said base frame, said seat structure foldable flatwise with said frame structure.

6. A baby stroller, involving: a base frame; a handle structure including a U-shaped handle and telescoping struts, said struts being pivotally connected to said base frame; fittings for latching said handle in an extended position on said struts; braces pivotally connected to the strut-receiving extremities of said handle and to said base frame, said struts, braces, handle and base frame adapted on release of said latch means to fold flatwise into substantial parallelism; a seat structure pivotally suspended between said fittings; and foldable retainer means extending between said handle frame and incorporating said seat structure and said base frame, said retainer means being placed under tension when said frame structure is extended to restrain said seat structure in a horizontal position.

7. A baby stroller, involving: a base frame; forward and rearward struts pivotally connected to the corners of said base frame; fittings pivotally joining said forward and rear struts; said struts and base frame defining triangular truss units; means incorporating a side of each triangular truss unit to permit folding of said truss unit and bring the other sides thereof into substantially coplanar relation; a seat frame pivotally supported between said fittings; a foldable seat member suspended from said seat frame; a handle extending rearwardly and upwardly from said forward struts; and tension members extending between said handle and the rear end of said base frame, said tension members forming in part the back of said seat member to restrain said seat against pivotal movement when said truss units are extended.

8. A baby stroller, involving: a frame structure including a base frame, forward and rearward struts pivotally connected thereto; a handle frame telescopically connected with said forward struts; fittings pivotally connecting said rear strut and handle frame at its telescoping extremities whereby said frame structure may be folded on telescoping said forward struts and handle frame; latch pin means carried by said fittings and engageable with said forward struts to secure said frame structure in its extended position; manually operable means for rendering said latch pin means inoperative to permit folding of said frame structure; and a seat structure pivotally suspended in said frame structure between said fittings.

ROBERT C. HEIDEMAN.

REFERENCES CITED

The following references are of record in the file of this patent:

UNITED STATES PATENTS

| Number | Name | Date |
| --- | --- | --- |
| D. 157,085 | Pinkerton | Jan. 31, 1950 |
| 1,482,146 | Pomilio | Jan. 29, 1924 |
| 2,452,929 | Holcomb | Nov. 2, 1948 |